(12) United States Patent
Meier

(10) Patent No.: US 9,008,371 B2
(45) Date of Patent: Apr. 14, 2015

(54) METHOD AND SYSTEM FOR ASCERTAINING THE POSITION AND ORIENTATION OF A CAMERA RELATIVE TO A REAL OBJECT

(75) Inventor: Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 1322 days.

(21) Appl. No.: 12/669,411

(22) PCT Filed: Jul. 3, 2008

(86) PCT No.: PCT/EP2008/005447
§ 371 (c)(1),
(2), (4) Date: Apr. 26, 2010

(87) PCT Pub. No.: WO2009/010195
PCT Pub. Date: Jan. 22, 2009

(65) Prior Publication Data
US 2010/0239121 A1 Sep. 23, 2010

(30) Foreign Application Priority Data
Jul. 18, 2007 (DE) .......................... 10 2007 033 486

(51) Int. Cl.
*G06K 9/00* (2006.01)
*G06T 7/00* (2006.01)
(52) U.S. Cl.
CPC ..... *G06T 7/0046* (2013.01); *G06T 2207/20101* (2013.01); *G06T 2207/30244* (2013.01)
(58) Field of Classification Search
USPC .......... 382/100, 106, 107, 152–154; 345/419, 345/427, 619, 629, 633, 679; 356/139.03, 356/138, 12; 33/286; 705/757
See application file for complete search history.

(56) References Cited

U.S. PATENT DOCUMENTS

| 5,436,638 A | 7/1995 | Bolas et al. |
| 7,023,536 B2 | 4/2006 | Zhang et al. |

(Continued)

FOREIGN PATENT DOCUMENTS

| DE | 20203367 | 6/2003 |
| DE | 102004046144 | 3/2006 |

(Continued)

OTHER PUBLICATIONS

Zhuang et al "A Noise-Tolerant Algorithm for Robotic Hand-Eye Calibration with or without Sensor Orientation Measurement", IEEE Transactions on Systems, Man, and Cybernetics, vol. 23, No. 4, Jul./Aug. 1993, pp. 1168-1175.

*Primary Examiner* — Hadi Akhavannik
(74) *Attorney, Agent, or Firm* — O'Shea Getz P.C.

(57) ABSTRACT

The invention relates to a method for ascertaining the position and orientation of a camera (11) relative to a real object (12) for use in merging a virtual data model (13) with an image generated by the camera (11), said image comprising at least one part of the real object (12). The method comprises the following steps: disposing the camera (11) on a movable part (22) of a sensor system (20) which is coupleable to at least one probe (23) which is suitable to come in contact with at least one part of the real object (12), positioning the movable part (22) of the sensor system, with the camera (11) applied, in such a manner that the image is generatable by the camera, and generating position data (31) of the sensor system (20) with respect to the real object (12), and determining the position and orientation of the camera (11) on the basis of the position data (31, 32) of the sensor system (20).

15 Claims, 6 Drawing Sheets

(56) References Cited

U.S. PATENT DOCUMENTS

| | | |
|---|---|---|
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,693,325 B2 * | 4/2010 | Pulla et al. .................... 382/154 |
| 7,729,515 B2 | 6/2010 | Mandella et al. |
| 7,826,641 B2 | 11/2010 | Mandella et al. |
| 7,961,909 B2 | 6/2011 | Mandella et al. |
| 2002/0105484 A1 | 8/2002 | Navab et al. |
| 2004/0189631 A1 | 9/2004 | Kazi et al. |
| 2005/0151963 A1 * | 7/2005 | Pulla et al. ............... 356/139.03 |
| 2005/0168437 A1 | 8/2005 | Carl et al. |
| 2005/0174361 A1 * | 8/2005 | Kobayashi et al. ........... 345/633 |
| 2005/0174436 A1 | 8/2005 | Lai |
| 2005/0285879 A1 * | 12/2005 | Suzuki et al. ................. 345/633 |
| 2007/0146391 A1 | 6/2007 | Pentenrieder |
| 2009/0153550 A1 * | 6/2009 | Keaney et al. ................ 345/419 |
| 2010/0007665 A1 * | 1/2010 | Smith et al. ................... 345/473 |
| 2010/0030578 A1 * | 2/2010 | Siddique et al. ................ 705/3 |
| 2010/0039380 A1 * | 2/2010 | Lanier ........................... 345/156 |
| 2010/0091031 A1 * | 4/2010 | Tsujimoto ..................... 345/589 |
| 2010/0091036 A1 * | 4/2010 | Wright et al. ................ 345/633 |
| 2010/0257252 A1 * | 10/2010 | Dougherty et al. ........... 709/217 |
| 2010/0271394 A1 * | 10/2010 | Howard ........................ 345/633 |
| 2011/0227915 A1 | 9/2011 | Mandella et al. |
| 2012/0038549 A1 | 2/2012 | Mandella et al. |
| 2013/0194418 A1 | 8/2013 | Gonzalez-Banos et al. |

FOREIGN PATENT DOCUMENTS

| | | |
|---|---|---|
| WO | 0196829 | 12/2001 |
| WO | 2005000139 | 1/2005 |

* cited by examiner

METHOD AND SYSTEM FOR ASCERTAINING THE POSITION AND ORIENTATION OF A CAMERA RELATIVE TO A REAL OBJECT

This application is entitled to the benefit of, and incorporates by reference essential subject matter disclosed in PCT Application No. PCT/EP2008/005447 filed on Jul. 3, 2008, which claims priority to German Patent Application No. 10 2007 033 486.0 filed Jul. 18, 2007.

BACKGROUND OF THE INVENTION

1. Technical Field

This invention relates to a method and system for ascertaining the position and orientation of a camera or a display apparatus relative to a real object for use in merging a virtual data model with an image generated by the camera or display apparatus, said image comprising at least one part of the real object.

2. Background Information

Such a method and system are known in the prior art in particular in connection with so-called augmented reality systems. These permit the superimposition of computer-generated, virtual information with visual impressions of the real environment. For this purpose the visual impressions of the real world are merged with virtual information preferably by means of semitransparent data goggles worn on the head. The insertion of the virtual information or objects can be effected in contextual fashion, i.e. being adapted and derived from the real environment being viewed. The virtual information employed can basically be any type of data such as texts, images, etc. The real environment can be detected with a camera, mounted for example on the head of the user. Through the superimposition of virtual and real environments, the user has the possibility to easily carry out actual/nominal comparisons. Upon a head movement of the user of an augmented reality system, all artificial objects must be registered to the changing field of view.

During an initialization process, an object of the real environment is correlated with the camera, for example. This permits a camera image to be assigned to the real environment. The real environment can be a complex apparatus and the detected object can be a striking element of the apparatus. During a following so-called tracking process, which represents the actual working process, while for example a user of the system receives, in an employed display device, contextual information inserted at a desired position in relation to the real environment, the inserted virtual data model is registered to the movement of the user and to an associated change in his view of the real world.

Further, augmented reality technology is known from the prior art in connection with a superimposition of virtual models with reality for the purpose of checking the correctness of the models or of the reality produced according to the specification. Ranges of application are for example factory planning, e.g. as described in DE 101 28 015 A1 or DE 10 2004 046 144 A1, or automobile design, as described in DE 202 03 367 A. From the prior art devices are also known that one moves with the hand and so as to assume a viewing position into a virtual world (e.g. U.S. Pat. No. 5,436,638 A).

Such augmented reality systems or methods basically involve the recognition of the camera pose relative to reality. The camera pose is the position and orientation of the camera in space. Reality is usually present in some form as a model, for example as a 3D model which circumscribes the geometrical properties of reality or a part of reality. The 3D model can be obtained for example from a design drawing, e.g. a CAD document. The real object is usually correlated to an object coordinate system, the camera in turn to a camera coordinate system. It is generally problematic here in particular to exactly ascertain the transformation between object coordinate system and camera coordinate system for determining the camera pose.

The object of the invention is to provide a system and method of the type stated at the outset which permit in each case a largely exact representation of virtual objects with regard to reality.

SUMMARY OF THE INVENTION

Examples of application of the invention comprise in particular factory planning, prototype construction or test construction in product development (e.g. also in crash tests for vehicle development), and acceptance in plant construction. It is thereby in particular possible to compare the quality of a virtual model with the real object, or of a real object with the virtual model.

Possible applications of the system and method according to the invention include in particular applications of augmented reality technology in the areas of service and maintenance, applications in production as well as applications in a mobile setting in general. The advantage resulting from the application of the inventive method and the inventive system is in particular a high exactness in ascertaining a transformation between object coordinate system and camera coordinate system for determining an exact camera pose with respect to the real object with the help of the sensor system, so that the virtual data model can be superimposed with reality largely exactly, or exact relative deviations between data model and reality are detectable.

In particular, the invention relates to a method for ascertaining the position and orientation of a camera relative to a real object of the type stated at the outset having the following steps: disposing the camera on a movable part of a sensor system which is coupleable to at least one probe which is suitable to come in contact with at least one part of the real object, positioning the movable part of the sensor system, with the camera applied, in such a manner that the image is generatable by the camera, generating position data of the sensor system with respect to the real object, and determining the position and orientation of the camera on the basis of the position data of the sensor system.

To ascertain the camera pose ideally on a real-time basis, different sensors or sensor combinations can be used. Advantageously there can be used highly exact mechanical measuring arms with probes which serve to calibrate the relative sensor position. It is thus possible to use a highly exact sensor system to ascertain a largely exact transformation between object coordinate system and camera coordinate system as the starting point for determining the camera pose.

In particular, a fixed part of the sensor system is disposed in a fixed relation to the real object, and a sensor coordinate system is set up as the frame of reference of the sensor system. Further, there is effected a determination of the position of the sensor coordinate system with respect to the real object. Advantageously, the determination of the position of the sensor coordinate system with respect to the real object is effected by the probe being brought in contact with at least one part of the real object in at least one calibrating process.

In one embodiment of the invention, the at least one calibrating process is performed according to one of a plurality of stored calibrating algorithms. For example, at least one part of a CAD model of the real object is selected by the user, there being selected on the basis of said selection a calibrating algorithm for the at least one calibrating process and at least one measuring program.

In a further aspect of the invention, the latter relates to a method for ascertaining the position and orientation of a camera or a display apparatus relative to a real object of the type stated at the outset having the following steps: disposing a tracking system on a first movable part of a sensor system which is coupleable to at least one probe which is suitable to come in contact with at least one part of the real object, and disposing the camera or the display apparatus in a fixed relation to a second movable part of the sensor system.

The first movable part of the sensor system is positioned such that the second movable part of the sensor system is detectable by the tracking system. The second movable part of the sensor system with the camera or display apparatus is positioned in such a manner that the image is generatable by the camera or display apparatus. Then, first position data of the sensor system with respect to the real object and second position data of the tracking system with respect to the second movable part of the sensor system are generated. The determination of the position and orientation of the camera or display apparatus is effected on the basis of the first and second position data.

This aspect reflects an advantageous realization of the inventive concept to the effect that the inventive idea can also be employed for the use of so-called head mounted displays (HMDs). For example, the second movable part of the sensor system is movable independently of the first movable part and is detected by the tracking system of the first movable part. Thus, a coupling between mobile camera or display apparatus (e.g. head mounted display) and sensor system is brought about such that the pose of the camera or display apparatus can be computed using the exact calibrating parameters of the sensor system relative to the real object without being bound mechanically to the sensor system. From the combination of mechanical sensor measuring system with a tracking system, for example an optical tracking system, which is fastened to the sensor head of the mechanical sensor system and tracks the camera or display apparatus, there results an overall system possessing a higher range and a lighter sensor head, combined with a largely exact ascertainment of the pose.

In particular, after inputting by means of the probe, it is possible to compute a pose of the camera or display apparatus, which is connected to the second movable part of the sensor system, dynamically via the transformation between tracking system and object coordinate system, the transformation between tracking system and second movable part of the sensor system and the transformation between the second movable part of the sensor system and the camera or display apparatus.

In one embodiment, the tracking system is executed as a mechanical tracking system or an optical tracking system. Optical measuring or tracking systems have the advantage in this connection that they allow a light, ergonomically easy-to-use and independently movable sensor head which can be mounted for example on the head. However, the sensor head delivers valid values only where it is seen by the optical sensors of the tracking system. The sensor head of mechanical measuring systems is heavier and has a lower range. However, it can be brought to more difficulty accessible places (for example the vehicle interior).

In one embodiment of the invention, a quality of the match of the virtual data model to the real object is determined; in particular there is effected a measurement of at least one distance between at least one part of the real object and at least one part of the virtual data model. For example, the determination of the quality of the match of the virtual data model to the real object is carried out using an edge-based or area-based tracking method.

A measurement of at least one distance between at least one part of the real object and at least one part of the virtual data model can be effected by the user selecting a part of the virtual model in the image or of the real object in reality by means of the probe so as to determine a first point, and subsequently the user selecting a corresponding part of the real object by means of the probe or of the virtual model in the image so as to determine a second point, whereby the distance to be determined is the distance between the first and second points.

The determination of the quality of the match of the virtual data model to the real object can comprise the step that the user or an implemented algorithm performs a comparison upon the merge of the real object and the virtual data model until at least one part of the data model superimposes a corresponding part of the real object largely correctly, whereby the measure of the performed comparison is employed as the basis for a statement about the quality of the match.

In particular, the invention also makes it possible to generate relatively exact inaccuracy information, in particular uncertainty information, upon the positioning of the data model relative to the real object, as explained more closely in DE 10 2005 061 952.

An advantageous embodiment of the inventive system provides that the camera or the tracking system is attached to an adapter device which produces a mechanical connection between camera/tracking system and the probe. By the use of an adapter interconnecting probe and camera/tracking system it is now possible to very easily carry out a highly exact superimposition. In particular, the adapter device is so designed that different probes are repeatably or interchangeably usable and removable again. Advantageously, the adapter device is so designed that upon connection with a probe the latter is automatically recognizable by the sensor system.

Another embodiment provides that a display device, in particular a screen, is attached to the adapter device for displaying the image of the camera. Likewise, the processing device for computing the desired pose can be attached to the adapter device. It is provided here e.g. that the camera, the processing device and the display device are executed as an integrated device which is attached to the adapter device which in turn produces a mechanical connection between the probe and integrated device.

Further advantageous embodiments and developments of the invention are to be found in the subclaims.

The invention will hereinafter be explained more closely with reference to the figures shown in the drawing, which show advantageous embodiments of the invention.

DETAILED DESCRIPTION OF THE INVENTION

Figure 1:
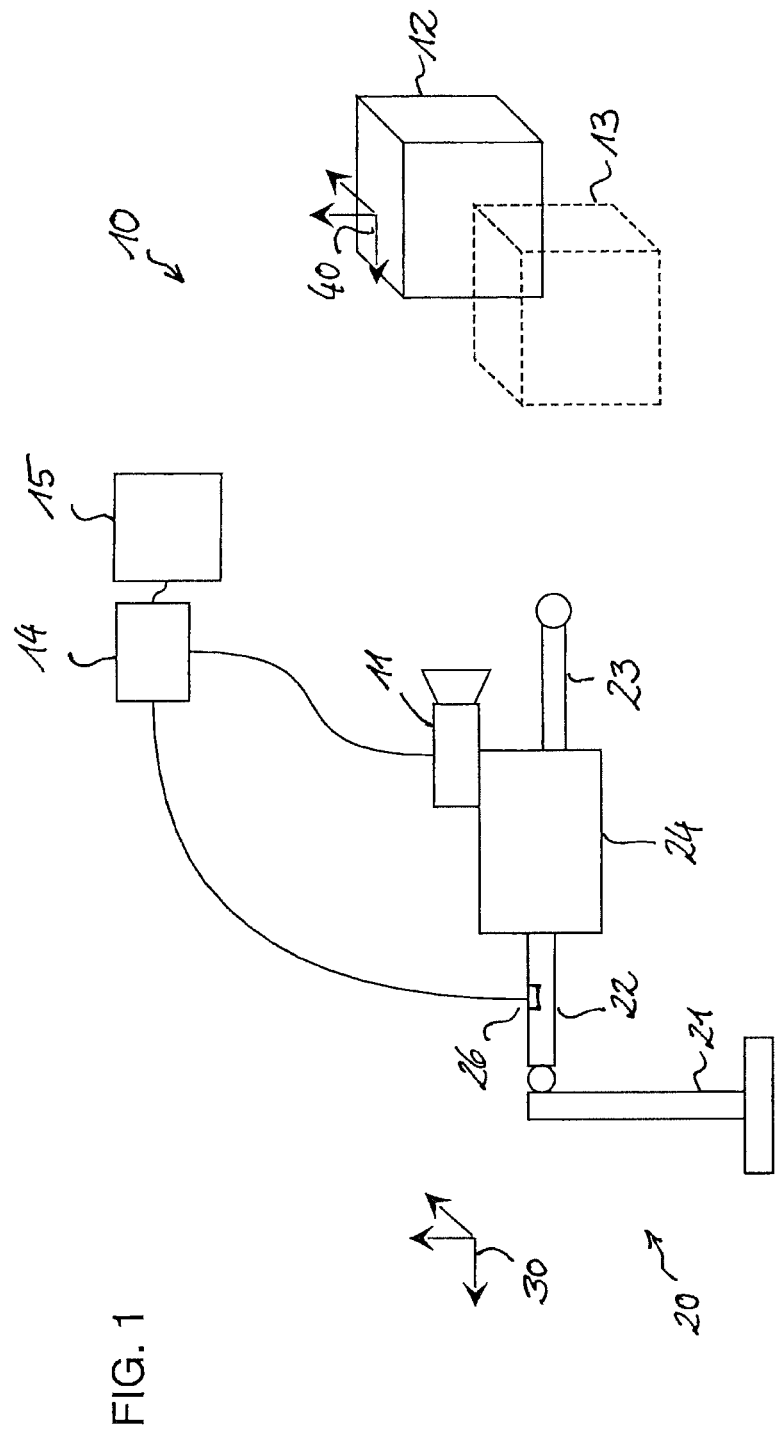
FIG. 1 shows a schematic representation of an embodiment of an inventive system for ascertaining the position and orientation of a camera relative to a real object.

FIG. 1 shows a schematic representation of an embodiment of an inventive system for ascertaining the position and orientation of a camera relative to a real object. The system 10 comprises a sensor system 20 with at least one movable part 22 which is fastened to a fixed part 21 via a movable joint. The sensor system can also have further movable parts which are in each case interconnected via joints or the like, or it can have one or more optical tracking systems which couple the individual parts of the sensor system. The thus formed movable part 22 in the form of a measuring arm is connected in the present example via an adapter device 24 to at least one probe 23 which is suitable to be brought in contact with at least one part of a real object 12. The sensor system can be configured in diverse ways, and can in particular also be realized as an optical sensor system. A camera 11 which is disposed on the measuring arm 22 of the sensor system 20 serves to generate an image. The camera 11 can be provided with a light source for illuminating the real object.

Further, an interface device 26 is provided in order to output position data of the sensor system 20 with respect to the real object 12, for determination of the position and orientation (pose) of the camera 11 relative to the real object 12, as to be explained hereinafter. Position data are understood to be in general data that permit an inference of the position and orientation of the relevant component. For example, the sensor system delivers only raw position data from individual sensor components and dimensions of components, which are only processed in an external computer into proper position data evaluable for the application.

This computation of the camera pose is performed in the present case by an external processing device 14 in the form of a computer which is coupleable to the interface device 26. The thus computed camera pose is used for contextually correct merging of a virtual data model 13 with the image generated by the camera 11, which is displayed on an external display apparatus 15 in the form of a screen. For this purpose, the computer 14 is connected both to the sensor system 20 and to the camera 11 to obtain the necessary parameters for ascertaining the camera pose, on the one hand, and the image of the camera 11, on the other hand. The virtual data model 13 is stored in the computer 14 and is superimposed on the basis of its computations on the image of the camera with the real object 12 on the screen 15 in contextually correct fashion.

The goal is to determine the pose, that is, the position and orientation, of the camera 11 relative to the object coordinate system 40 of the real examination object 12 and thus to be able to superimpose a virtual geometry in the form of the data model 13 on the real object 12. For example, the virtual geometry 13 can be a CAD design of a constructional element, and the real object 12 a real prototype resulting from the CAD design. Further, a sensor coordinate system 30 (so-called sensor world coordinate system) is set up as the frame of reference of the sensor system.

Figure 2:
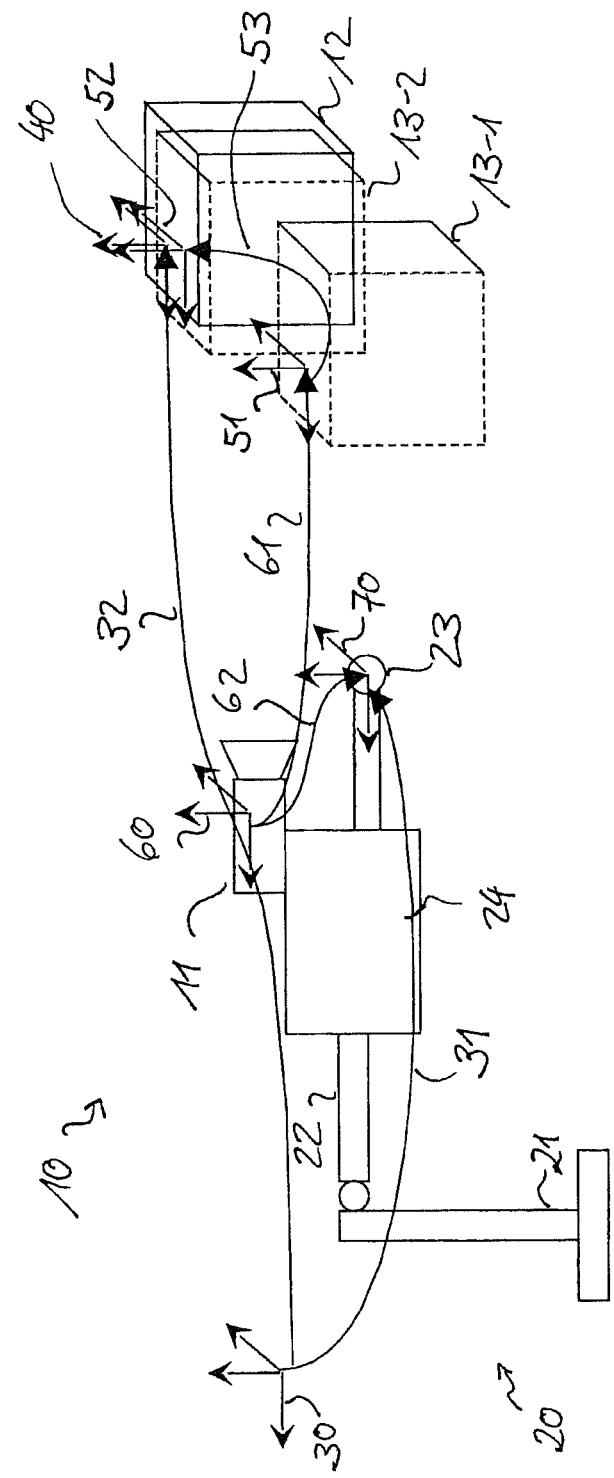
FIG. 2 shows a schematic representation of the system according to FIG. 1 with visualized transformations between the individual components.

FIG. 2 shows a schematic representation of the system according to FIG. 1 with visualized transformations between the individual components. To ascertain the pose of the camera 11 ideally on a real-time basis, different sensors or sensor combinations of a sensor system 20 can be used. Advantageously, highly exact mechanical measuring arms can be used, schematically illustrated in the form of the measuring arms 21, 22. However, the pose does not result directly from the sensor measuring result, but results additionally from the transformation 32 of the sensor world coordinate system 30 to the object coordinate system 40 of the real object 12 and the transformation 62 between camera coordinate system 60 and sensor head coordinate system 70, the sensor head being formed by the probe 23. The transformations 32 and 62 are preferably stored permanently in the computer 14 or in the sensor system 20. Hence, they do not always have to be generated anew but are called up accordingly for computing the pose.

For ascertaining the transformation 62 between sensor head coordinate system 70 and camera coordinate system 60 there can be used calibration methods known from the prior art (e.g. "hand-eye calibration"). For example, there is used a method as described in IEEE Transactions on Systems, Man and Cybernetics, vol. 23 (1993), July/August, no. 4, New York (U.S.), pages 1168-1175, "A noise-tolerant algorithm for robotic hand-eye calibration with or without sensor orientation measurement" by Y. Zhuang and Y. C. Shiu ("robotic visual-motor calibration").

The ascertainment of the transformation 32 between object coordinate system 40 and sensor world coordinate system 30 has hitherto generally been problematic in the area of augmented reality. To solve this problem there is used according to the invention a sensor system in combination with a camera, as illustrated by the sensor system 20 and the camera 11. In particular, there is used a sensor system 20 wherein the real object 12 is touched by means of so-called probes 23. This means that, as the starting point (so-called calibrating process), geometrical properties, such as surfaces or bores, are approached and touched by the operator of the sensor system 20 and thus their position in the sensor world coordinate system 30 is ascertained. Consequently, there is ascertained in this way, upon the so-called calibration, the transformation 32 between object coordinate system 40 and sensor world coordinate system 30. The latter is set in fixed relation to the stationary part 21 of the sensor system 20 and to the real object 12. Likewise, the stationary part 21 is in fixed relation to the real object 12. The transformation 31 between sensor head coordinate system 70 and sensor world coordinate system 30 is delivered by the sensor system 20.

After calibration, the measuring arm 22 of the sensor system, with the camera 11 applied, is positioned in such a manner that the image is generatable by the camera. In the course thereof, position data of the sensor system 20 with respect to the real object 12 are generated to form the transformation 31, and the position and orientation of the camera 11 is determined on the basis of the position data. In the present example the transformation 62 is additionally necessary for ascertaining the camera pose relative to the sensor head 23.

In particular, the following steps are carried out to ascertain starting parameters for computing the camera pose. This is required e.g. for augmented reality visualization (AR visualization):

Upon positioning of the sensor system 20, with the camera 11 applied, so that the camera 11 detects the object 12 to generate an image, the position of the probe 23 with respect the sensor world coordinate system 30 is determined, and the position data of the probe 23 with respect to the sensor world coordinate system 30 are output in the form of the transformation 31. The position and orientation of the camera 11 relative to the real object 12 is then determined on the basis of the transformation 31, of the position of the sensor world coordinate system 30 with respect to the real object 12 (transformation 32), and on the basis of the position of the camera 11 with respect to the probe 23 (transformation 62). Basically the transformation T between camera 11 and real object 12 as required for AR visualization thus results as:

$$T^{-1} = 32^{-1} \cdot 31 \cdot 62^{-1}$$

Figure 3A:
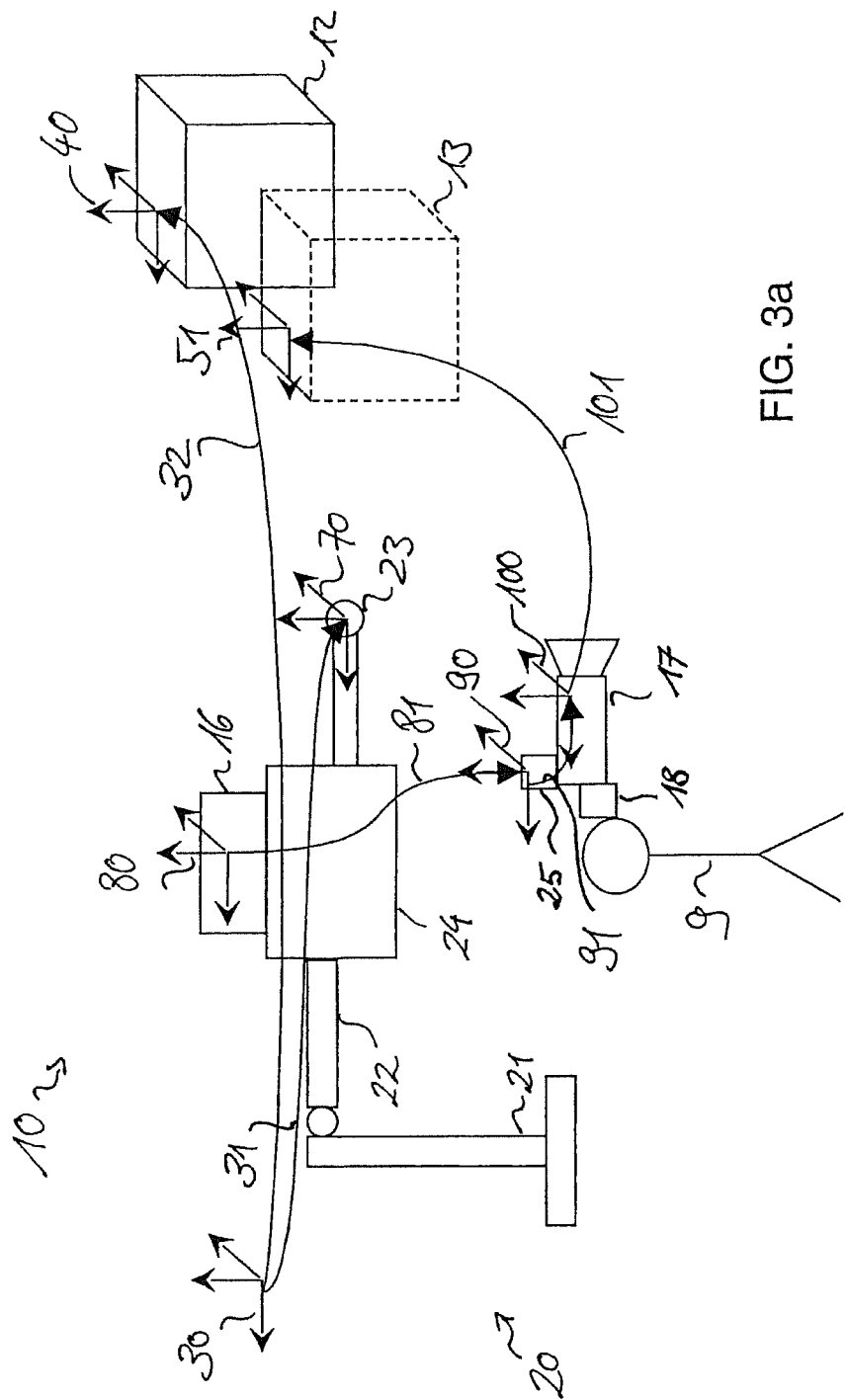
FIG. 3 shows a schematic representation of further embodiments of an inventive system for ascertaining the position and orientation of a camera or a display apparatus relative to a real object with respective visualized transformations between the individual components.
Figure 3B:
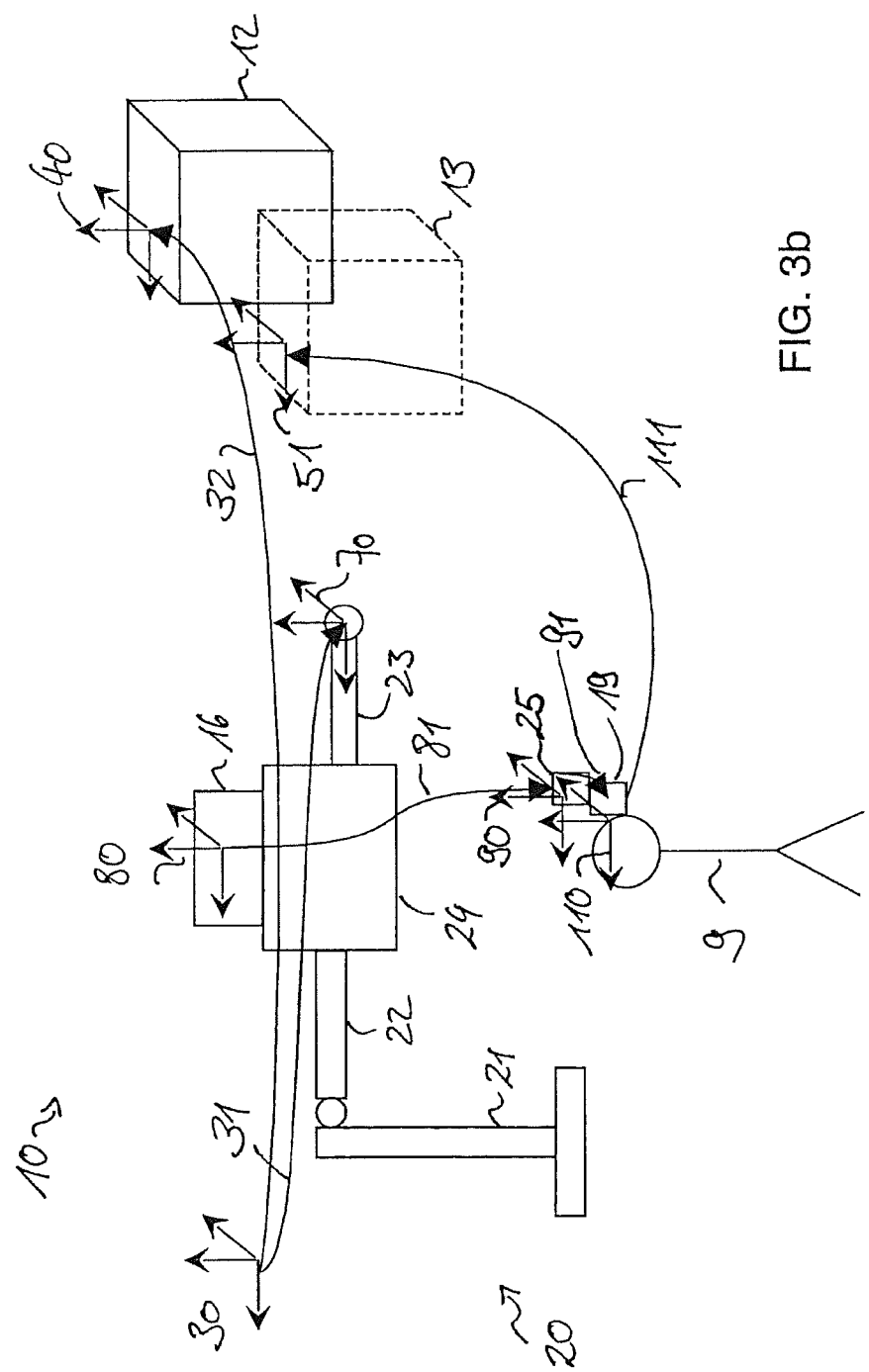

When the starting parameters for determining the camera pose have been ascertained, the pose can then be ascertained by per se known methods of computation. The computations take place on the computer 14 which is connected to the corresponding sensors including the camera 11 and is able to generate virtual images from 3D data taking into account the camera parameters, pose and display surface, to mix them with a camera image which has advantageously been corrected on the basis of the camera data, and to display them on a display device 15 and/or a head-mounted screen system 18, 19 (FIGS. 3a, 3b). The ascertainment of the camera parameters per se is known from the prior art. Likewise, the correction of a camera image on the basis of the camera parameters is known per se. The transfer of the camera data can advantageously be effected by means of digital transfer standards, such as the IEEE 1394 standard.

In this way there can be ascertained the transformation 61 between camera coordinate system 60 and coordinate system 51 of the data model 13 (in the starting position 13-1), as well as the shift transformation 53 between coordinate system 51 in the starting position 13-1 and coordinate system 52 of the data model 13 in the shifted position 13-2.

In the computer 14 there is stored a corresponding computer program which performs the determination of the position and orientation of the camera 11 on the basis of the particular position data according to the described method.

By the use of a preferably rigid adapter device 24 interconnecting interchangeable probes 23 and the camera 11 there can now be carried out very simply a highly exact superimposition. The adapter device 24 is to be designed according to the invention, by means of mechanical methods from the prior art, in such a way that different probes 23 can be used and secured with high repeat accuracy. Advantageously, the probes 23 are equipped with possibilities so that the adapter device 24, which can be equipped with corresponding sensor means, automatically recognizes the probes and the computer 14 can automatically call up accordingly corrected probe information. The adapter device 24 can advantageously be supported by a stand or similar mechanical means (cable pull, etc.), or the operator can be relieved.

FIG. 3 shows a schematic representation of further embodiments of an inventive system 10 for ascertaining the position and orientation of a camera or a display apparatus relative to a real object with respective visualized transformations between the individual components. The system 10 again comprises a sensor system 20 with at least one first movable part in the form of the measuring arm 22 to which at least one probe 23 is coupleable. Moreover, a second movable part 25 of the sensor system 20 is provided which in the present case is not connected mechanically to the measuring arm 22, being, so to speak, an independently movable sensor head 25. In the simplest case the sensor head 25 can be merely a marking of any kind.

A tracking system 16, for example an optical tracking system, which is disposed on the measuring arm 22 of the sensor system is used for tracking the sensor head 25. For this purpose, the tracking system comprises a camera with a computer system, which detects and tracks e.g. a marker of the sensor head 25. For this purpose, the transformation 81 between tracking system coordinate system 80 and sensor head coordinate system 90 (e.g. defined by markers) is ascertained. For ascertaining the transformation between probe coordinate system 70 and tracking system coordinate system 80, "hand-eye calibration" can again be used. Further, the transformation 91 between sensor head coordinate system 90 and camera coordinate system 100 is known. The transformation 101 designates the transformation between camera coordinate system 100 and coordinate system 51 of the data model 13.

In the embodiment according to FIG. 3a a camera 17 is disposed on the sensor head 25 of the sensor system and is suitable and positioned in such a way as to generate an image comprising at least one part of the real object 12. The image generated by the camera is visualized on a head-mounted display (HMD) 18 which is worn by the user 9 on his head and on which the virtual information is also displayed. The tracking system 16 (also designated as a so-called outside-in sensor system) or the measuring arm 22 is disposed such that the camera 17 is detected by the tracking system 16. Camera 17 and display 18 form a so-called video see-through system wherein there is located before the eye of the user a videoscreen (display 18) on which real and virtual visual impressions are merged.

An interface device 26 (cf. FIG. 1) is used for outputting first position data (in particular for computing the transformation 31) of the sensor system 20 with respect to the real object 12, and second position data (in particular for computing the transformation 81) of the tracking system 16, for determination of the position and orientation of the camera 17 relative to the real object 12 by the processing device 14 coupleable to the interface device 26. Said data find use in merging a virtual data model 13 with the image generated by the camera 17. The interface device 26 can be wireless or wired, and can also comprise a plurality of individual interfaces, also at different places in the sensor system. For example, the tracking system 16 can also be connected directly to the computer 14 via a corresponding interface of the interface device.

In other words, the outside-in sensor system 16 views a so-called outside-in sensor head 25 and dynamically ascertains the pose with respect to the sensor head coordinate system 90. A suitable outside-in sensor system 16 can be for example an optical tracking system with one or more cameras for which optical markers constitute the sensor head 25. However, it is also possible to use methods that ascertain the pose via measurements of time or angle. By means of the transformation 91 of the sensor head 25 to the camera 17 advantageously fastened to the head-mounted screen system 18 there can be superimposed for the viewer 9 a virtual object 13 which is located in a pose as correct as possible relative to the real object 12. It is possible that the camera 17 is a stereo camera system and the HMD displays a stereoscopic image. It is a further advantageous setup that the HMD is replaced by a portable monitor which is equipped with a camera and an outside-in sensor head.

In the embodiment according to FIG. 3b, instead of the camera 17 and the display 18 there is a display apparatus 19 in the form of a semitransparent head-mounted display (optical see-through display apparatus) disposed directly on the sensor head 25 of the sensor system. In the case of an optical see-through, merging is effected by a so-called optical mixer—a semitransparent display apparatus before the eye of the user wherein the real world is to be seen via the transparency of the apparatus and the superimposition of virtual information is effected via projection onto the display apparatus. Hence, the camera 17 can be omitted. The position determination of the display apparatus 19 is effected analogously to the system according to FIG. 3a (as explained with respect to the camera 17 therein). For this purpose, the transformation 91 between sensor head coordinate system 90 and display coordinate system 110 is known. The transformation 111 designates the transformation between display coordinate system 110 and coordinate system 51 of the data model 13. In this case there is generally also required a so-called see-through calibration, as described for example in the print US2002/0105484 A1.

The explanations regarding FIGS. 1 and 2 with regard to the pose determination of the camera 11 also apply analogously to the pose determination of the tracking system 16 in the arrangements according to FIG. 3, wherein, instead of the camera 11, the tracking system 16 is disposed on the measuring arm 22.

Figure 4:
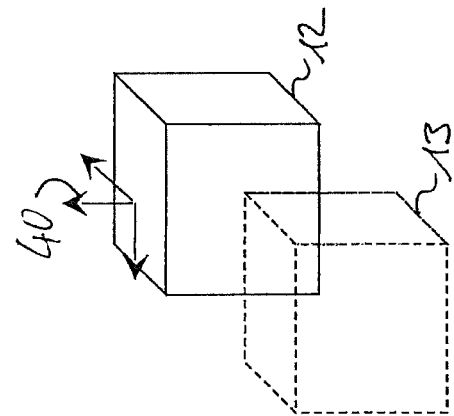
FIG. 4 shows a schematic representation of a further embodiment of an inventive system.
Figure 4:
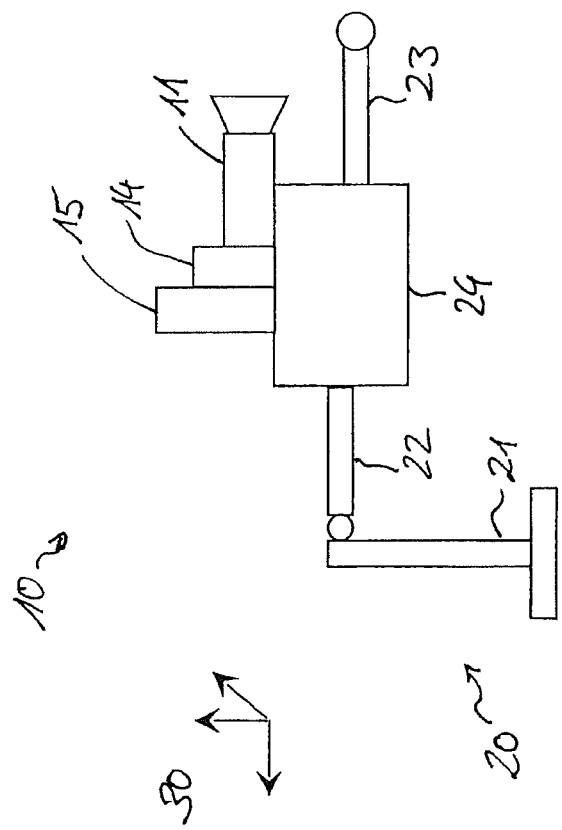

FIG. 4 shows a further advantageous setup wherein a display device 15 for displaying the image of the camera 11 is attached to the adapter device 24. Moreover, the computer 14 is also attached to the adapter device 24. Preferably, the camera 11, the computer 14 and the display device 15 are executed as an integrated device which is attached to the adapter device 24. This case involves an integrated solution (e.g. compact computer with screen and integrated camera, as basically known from the prior art).

Figure 5:
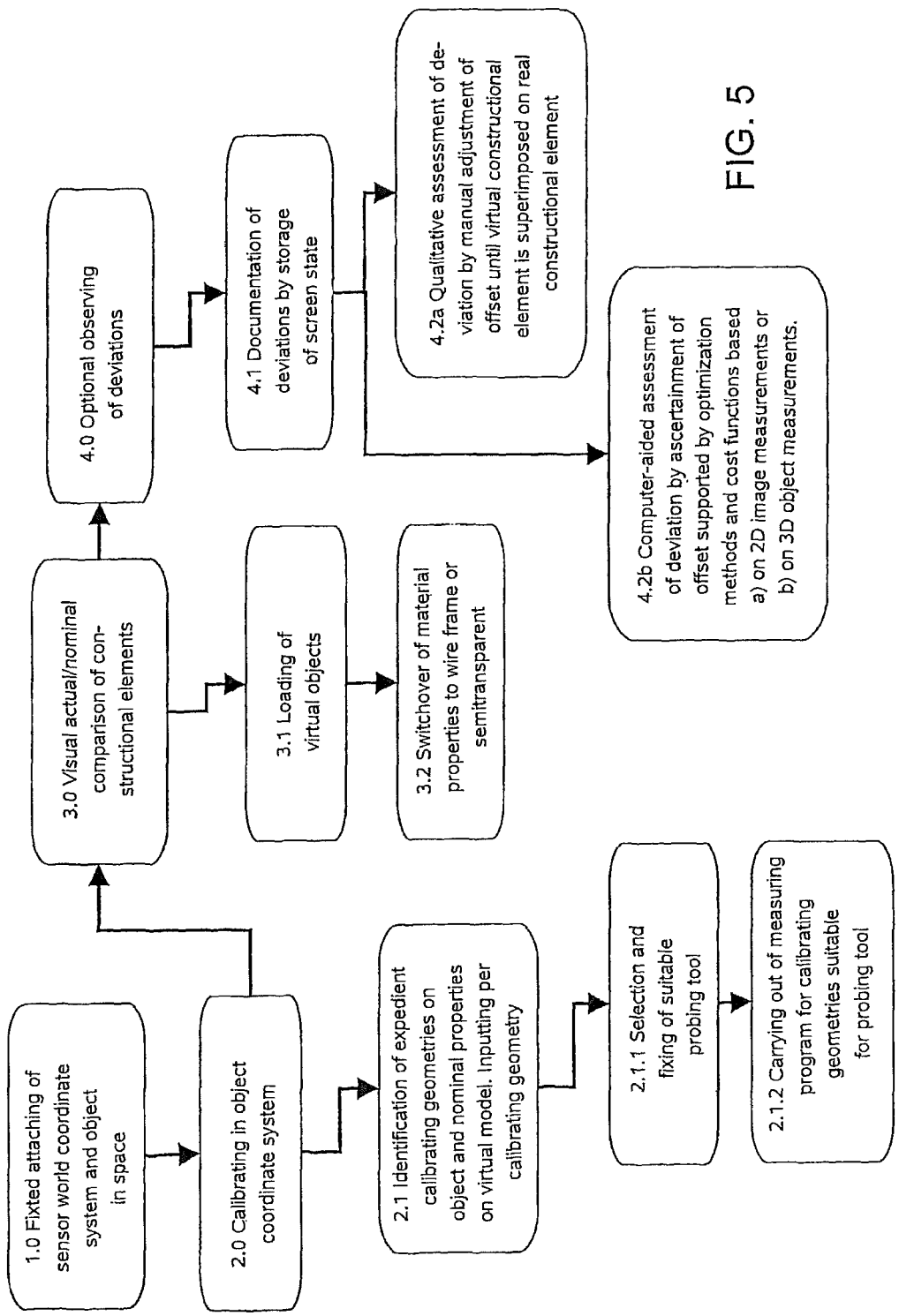
FIG. 5 shows a flowchart for a course of a method in an augmented reality system in which the inventive concept is implemented.

FIG. 5 shows a flowchart for a course of a method in an augmented reality system in which the inventive concept is implemented. In particular, FIG. 5 shows an advantageous course of a superimposition of constructional elements by means of the system setup from FIGS. 1 to 3.

In a first step it is ensured that the object 12 and the sensor world coordinate system 30 have a fixed relation to each other (step 1.0). Then the calibrating process is carried out by means of the probe 23 (step 2.0) and the result stored in the computer 14. The calibrating process advantageously consists of the identification of expedient calibrating geometries on the object 12 (for example, bores or faces). For different calibrating geometries, different forms of probes (for example, point or ball) can be advantageous. To avoid changing probes, the calibrating geometries are expediently input being arranged according to forms of probes. To permit a calibrating process to be carried out, the possible algorithm must both know the actual property relative to the sensor world coordinate system 30 and know the corresponding nominal property in the object coordinate system 40. Advantageously, the user can select a part (for example, a point, an edge or an area) of a CAD model for example by a mouse click in order to inform the system of which correspondence is involved. In particular, an algorithm now determines the order of the measuring programs from the CAD topology of the environment of the selected CAD part and the selected calibrating algorithm according to a rules set, whereby expedient measuring programs according to the rules set are arranged at the top in a selection. A further possibility is that the user need not select a calibrating algorithm at the beginning, but only selects CAD parts, and a rules set then globally defines the calibrating algorithm, the individual measuring programs, the choice of probes and the order of measuring programs and of CAD parts to be input. If no CAD model is present, it is also possible to directly specify nominal properties with restrictive degrees of freedom (step 2.1).

If it is known to the program which CAD part or which input nominal property is to be input with which measuring program, or the program has informed the user thereof, for example visually, the user can insert the desired probe, if not already inserted, and carry out the measuring program (for example, the method of a round stylus ball on a plane). This process is carried out for each selected CAD part. Finally, the calibrating algorithm can determine the transformation 32 (steps 2.1.1 and 2.1.2).

Now the examination can be continued. For example, additional design elements can now be virtually attached to a prototype vehicle as the real object 12, or an actual/nominal comparison of constructional elements can be carried out (step 3.0). For this purpose, it is possible to load one or more virtual objects, for example described by Virtual Reality Modeling Language (VRML) (step 3.1). But it is, optionally, also possible to directly display the virtual geometry employed for calibrating. Advantageously, the material properties of the digital models can be changed (step 3.2).

If the visual check is not satisfactory, it is optionally possible to specifically document deviations (step 4.0). A measurement of a distance between a part of interest in the real object and a corresponding part in the virtual data model can be effected for example by the user selecting a part of the virtual model, e.g. an interest point, in the image so as to determine a first point, and the user subsequently selecting a corresponding part of the real object by means of the probe so as to determine a second point, whereby the distance to be determined is the distance between the first and second points. This selection order is also reversible, i.e. there can first be selected by means of the probe an interest point on the real object in reality and thereafter a corresponding point in the virtual model.

There is the possibility of communication with participants to store the actual screen state (step 4.1, for example as a JPEG). If a quantitative statement is to be made, the user has, on the one hand, the possibility to change, for example by an operating element, for example a mouse wheel, individual degrees of freedom of the correction transformation 53 (FIG. 2) to the superimposed, virtual geometry 13 until the geometry 13 superimposes the real part 12 as correctly as possible (step 4.2a). The correction transformation 53 then yields a statement about the deviation. Alternatively, there is the possibility of a computer-aided ascertainment of the deviation (step 4.2b). In this case an optimization method varies the correction transformation 53 and measures the remaining deviation which enters into the cost function of the optimization method. The measurements of the cost functions can be effected two-dimensionally or three-dimensionally. Three-dimensional data can, on the one hand, be ascertained by additional 3D sensors, such as a laser scanner, or be obtained by means of 3D reconstruction algorithms known from the prior art which employ different camera views and the associated tracking data.

Advantages and applications of the system and method according to the invention shall be summed up once again:

Current systems possess the disadvantage that the establishment of the relation between sensor coordinate system and object coordinate system is usually insufficiently solved. For example, a tracking system views e.g. a marking in reality (for example, on a vehicle). However, the marking must previously be calibrated separately with regard to the world coordinate system (vehicle coordinate system) by means of a measuring system. Hence, the clear advantage of the described system and method is the direct combination of calibrating and viewing systems. The following advantages result:

Saving of time in superimposition tasks, because no change between calibrating and viewing tools is necessary. This relates to the physical change and to the switchover in the operating software.

Saving of hardware costs, for example in optical systems, because expensive markings must only be procured and maintained for a combined head, not for different heads.

Reduction of software complexity since the software need not manage different optical markers, for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for merging a virtual data model with an image generated by a camera, said image comprising at least one part of a real object, having the following steps:
   disposing the camera on a movable part of a sensor system which is coupled at least temporarily to at least one probe which is suitable to come in contact with at least one part of the real object in a calibrating process;
   positioning the movable part of the sensor system, with the camera applied, in such a manner that the image is generated by the camera, and generating position data of the sensor system with respect to the real object, wherein the movable part of the sensor system is a measuring arm; and
   determining the position and orientation of the camera relative to the real object on the basis of the position data of the sensor system and merging a virtual data model representing a design drawing with the image generated by the camera, on the basis of the position and orientation of the camera;
   whereby the virtual data model is superimposed largely precisely with the real object or relative deviations between the virtual data model and the real object are ascertained; and
   wherein for determination of the position and orientation of the camera, a determination of the position of the camera with respect to the at least one probe is effected by hand-eye calibration.

2. The method according to claim 1, having the steps of:
   disposing a fixed part of the sensor system in a fixed relation to the real object and setting up a sensor coordinate system as the frame of reference of the sensor system; and
   determining a position of the sensor coordinate system with respect to the real object.

3. The method according to claim 2, wherein
   the determination of the position of the sensor coordinate system with respect to the real object is effected by the probe being brought in contact with at least one part of the real object in at least one calibrating process.

4. The method according to claim 3, wherein
   the at least one calibrating process is performed according to one of a plurality of stored calibrating algorithms.

5. The method according to claim 1, wherein
   for determination of the position and orientation of the camera a determination of the position of the camera with respect to the probe is effected by hand-eye calibration.

6. A method for merging a virtual data model with an image generated by the camera or display apparatus, said image comprising at least one part of a real object, having the following steps:
   disposing a tracking system on a first movable part of a sensor system which is coupled at least temporarily to at least one probe which is suitable to come in contact with at least one part of the real object in a calibrating process, wherein the first movable part of the sensor system is a measuring arm;
   disposing the camera or the display apparatus in fixed relation to a second movable part of the sensor system;
   positioning the first movable part of the sensor system such that the second movable part of the sensor system is detectable by the tracking system,
   positioning the second movable part of the sensor system with the camera or display apparatus in such a manner that the image is generated by the camera or the display apparatus, and generating first position data of the sensor system with respect to the real object and second position data of the tracking system with respect to the second movable part of the sensor system; and
   determining the position and orientation of the camera or the display apparatus relative to the real object on the basis of the first and second position data and merging a virtual data model representing a design drawing with the generated image on the basis of the position and orientation of the camera or the display apparatus;
   whereby the virtual data model is superimposed largely precisely with the real object or relative deviations between the virtual data model and the real object are ascertained; and
   wherein for determination of the position and orientation of the camera or the display apparatus, a determination of the transformation between the tracking system and the at least one probe is effected by hand-eye calibration.

7. The method according to claim 1, wherein
   a quality of the match of the virtual data model to the real object is determined, in particular a measurement of at least one distance between at least one part of the real object and at least one part of the virtual data model is effected.

8. The method according to claim 7, wherein
   a measurement of at least one distance between at least one part of the real object and at least one part of the virtual data model is effected by the user selecting a part of the virtual model in the image or of the real object by means of the probe so as to determine a first point, and subsequently the user selecting a corresponding part of the real object by means of the probe or of the virtual model in the image so as to determine a second point, whereby the distance to be determined is the distance between the first and second points.

9. The method according to claim 7, wherein
   the determination of the quality of the match of the virtual data model to the real object is carried out using an edge-based or area-based tracking method.

10. The method according to claim 7, wherein
    the determination of the quality of the match of the virtual data model to the real object comprises the step that the user or an implemented algorithm performs a comparison upon the merge of the real object and the virtual data model until at least one part of the data model superimposes a corresponding part of the real object largely correctly, whereby the measure of the performed comparison is employed as the basis for a statement about the quality of the merge.

11. The method according to claim 7, wherein
    inaccuracy information is generated upon the positioning of the data model relative to the real object.

12. A system for merging a virtual data model with an image generated by a camera, comprising;
    a sensor system having at least one movable part to which at least one probe is coupled at least temporarily which is suitable to come in contact with at least one part of the real object in a calibrating process, wherein the movable part is a measuring arm;

a camera which is disposed on the movable part of the sensor system and which is suitable to generate an image which comprises at least one part of the real object;

having an interface device in order to output position data of the sensor system with respect to the real object, for determining the position and orientation of the camera relative to the real object; and a processing device coupled to the interface device and adapted for determining the position and orientation of the camera relative to the real object on the basis of the position data of the sensor system, and for merging a virtual data model representing a design drawing with the image generated by the camera, on the basis of the position and orientation of the camera, whereby the virtual data model is superimposed largely precisely with the real object or relative deviations between the virtual data model and the real object are ascertained, and wherein for determination of the position and orientation of the camera, a determination of the position of the camera with respect to the at least one probe is effected by hand-eye calibration.

13. The system according to claim 12, wherein the camera, the processing device and a display device for displaying the image of the camera are executed as an integrated device which is attached to an adapter device which produces a mechanical connection between the probe and integrated device.

14. A system for merging a virtual data model with an image generated by a camera or a display apparatus, comprising:

a sensor system having at least one first movable part to which at least one probe is coupled at least temporarily which is suitable to come in contact with at least one part of the real object in a calibrating process, and having a second movable part, wherein the first movable part is a measuring arm;

a tracking system which is disposed on the first movable part of the sensor system;

a camera or a display apparatus which is disposed on the second movable part of the sensor system and which is suitable to generate an image which comprises at least one part of the real object;

whereby the tracking system is adapted to be disposed such that the second movable part of the sensor system is detectable by the tracking system;

having an interface device in order to output first position data (of the sensor system with respect to the real object and second position data of the tracking system with respect to the second movable part of the sensor system, for determining the position and orientation of the camera or the display apparatus relative to the real object; and processing device coupled to the interface device adapted for determining the position and orientation of the camera or the display apparatus relative to the real object, and for merging a virtual data model representing a design drawing with the generated image on the basis of the position and orientation of the camera or the display apparatus, whereby the virtual data model is superimposed largely precisely with the real object or relative deviations between the virtual data model and the real object are ascertained, and wherein for determination of the position and orientation of the camera or the display apparatus, a determination of the transformation between the tracking system and the at least one probe is effected by hand-eye calibration.

15. A non-transitory computer program product having software code portions which are suitable to perform a method according to claim 1 for determining the position and orientation of the camera on the basis of the position data of the sensor system, when they are stored in a system for ascertaining the position and orientation of the camera relative to the real object.

* * * * *